United States Patent [19]
McLemore

[11] Patent Number: 6,012,382
[45] Date of Patent: Jan. 11, 2000

[54] FLAME DISK AND SMOKER GRILL ASSEMBLY USING THE SAME

[76] Inventor: Don C McLemore, 450 Brown Ave., Columbus, Ga. 31906

[21] Appl. No.: 09/092,812

[22] Filed: Jun. 5, 1998

[51] Int. Cl.[7] .................................................. A47J 37/00
[52] U.S. Cl. ............................... 99/400; 99/401; 99/446; 99/447; 126/41 R
[58] Field of Search ............................. 9/446, 447, 444, 9/400, 401, 482; 126/25 R, 9 R, 41 R

[56] References Cited

U.S. PATENT DOCUMENTS

| | | | |
|---|---|---|---|
| 2,842,043 | 7/1958 | Reuland | 99/482 |
| 2,894,448 | 7/1959 | Henderson et al. | 99/482 X |
| 4,446,776 | 5/1984 | Gelfman | 99/447 X |
| 5,555,795 | 9/1996 | Tsai | 99/446 |

*Primary Examiner*—Reginald L. Alexander
*Attorney, Agent, or Firm*—Smith, Gambrell & Russell, LLP

[57] ABSTRACT

A flame disk for even heat distribution when using an external flame such as in a smoker grill assembly, and which prevents internal food drippings from escaping through the disk. The disk design enhances the heat efficiency, and safeguards against drippings or ashes falling through to the burner or ground. The disk design offers better performance when cooking. The holes in the disk are raised, and has attached legs strategically placed over the holes to deter drippings or ashes from falling through. The legs also support and lift the disk on its cooking base.

31 Claims, 2 Drawing Sheets

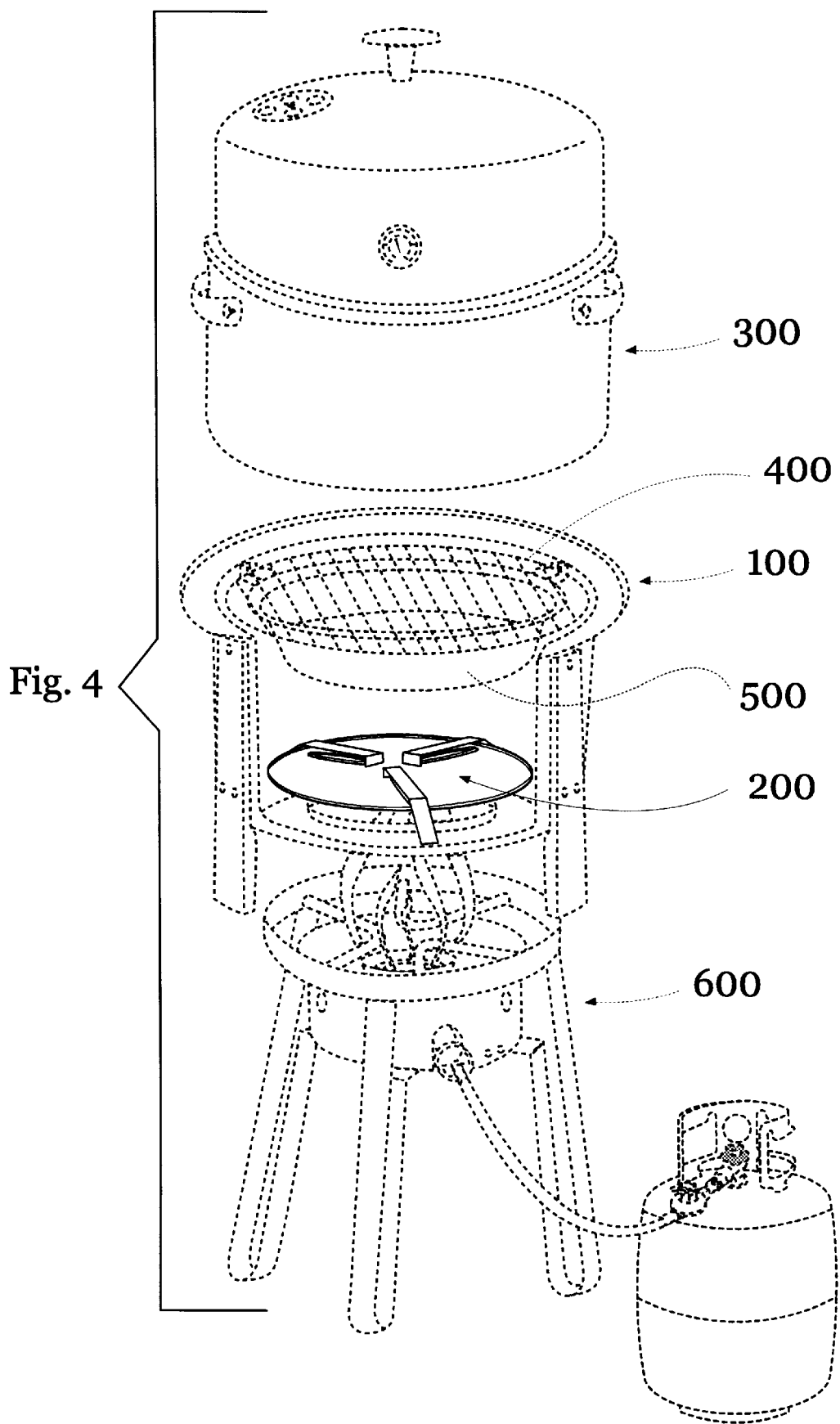

FLAME DISK AND SMOKER GRILL ASSEMBLY USING THE SAME

This invention relates generally to the field of a flame disk suited for use in a cooking unit such as a smoker grill assembly, and as an apparatus for even heat distribution when using an external flame. The flame disk design of the present invention helps to prevent internal food drippings or ashes from escaping through the cooking unit.

SUMMARY OF THE INVENTION

The primary object of the invention relates to a flame disk design that helps distribute the flame from the burner evenly throughout the unit for direct grilling, or when burning wood chunks when smoking. The disk also prevents internal food drippings or ashes from escaping through the disk, while allowing heat to pass through. The flame disk design is heat efficient and safeguards against drippings or ashes falling through to the burner or ground. The holes in the disk are raised to deter food drippings and ashes from falling through to the ground, while adding rigid strength to the disk. The disk has attached support cover legs, which lifts the disk on its cooking base. These legs have been strategically placed over the raised holes in the disk, which adds additional protection against food drippings escaping through the disk holes, while also allowing heat to pass through while cooking.

Another feature of the invention is the providing of a disk that is designed to protect the burner. The disk is also designed for easy removal, which allows for quick clean up. Still yet another feature of the invention is the disk has a series of raised holes for optimum heat placement, and allows for more efficient burn time when smoking with wood. A further feature of the invention is the disk design allows for better insulation keeping more heat inside the unit when grilling or smoking.

The invention thus features a flame disk that comprises a plate having a peripheral edge and a plurality of holes formed internally of the peripheral edge as well as leg supports. The leg supports being connected with said plate and said leg supports having a lower contact end positioned below the plate so as to place the plate in a suspended state with respect to the leg supports, and the leg supports having an upper section which extends over the holes so as to cover the holes. In an embodiment of the present invention each of the holes is defined by a raised extension extending upward from a base portion of the plate. The plate is further defined by a raised peripheral edge which extends upward from the base portion of said plate, with the raised extension of said holes extending vertically up from the base portion of said plate to a greater extent than that of the raised peripheral edge.

In an embodiment of the invention an upper edge of each of the holes defines an exit opening having an exit opening perimeter, and the upper section of the support legs extends over respective exit openings and each of said upper sections has a covering area which exceeds an area defined by the exit opening perimeter being covered such that the upper sections completely cover, from a plan view perspective, the exit openings. The upper sections extend parallel with an upper face of the base portion of the plate in the noted embodiment. In addition, the leg supports include an internal extension which extends from an internal end of respective upper sections into contact with the upper face of the base portion. The internal sections are arranged so as to extend transversely with respect to both said upper section and said base portion.

An embodiment of the present invention also features leg supports that include an outer section extending radially out from an outer end of said upper section, and said outer section including a sloped section that extends to the lower contact end of the leg supports, and the sloped section has a slope which places an interior surface of the sloped section in a flush relationship with respect to the raised outer edge of the circular plate, with the upper face of said plate being suspended at about an intermediate height of a rise in said sloped section.

In an embodiment of the invention, the plate has a plurality of raised edges defining the holes which raised edges extend radially in a common direction with a radial extension of the upper section of the leg supports. Also, the raised edges have an oblong shape with a radial length that is less than a radial extension of the upper section and a maximum circumferential width that is less than that of a corresponding upper section so that the upper extensions completely cover over corresponding oblong shaped holes. In one embodiment there are three individual leg supports and three oblong shaped holes formed in the plate.

In an embodiment of the invention, the invention provides a flame disk for use in a smoking or grilling apparatus that comprises a plate having a raised peripheral edge and a plurality of holes internally of the raised peripheral edge, and the holes being defined by raised extensions extending up from a face portion of the plate. The flame disk further including hole coverings that extend vertically above an upper edge of respective raised extensions so as to completely cover the holes, when viewed in a plan view perspective. The supports are in contact with the plate such that the plate is suspended above a surface contact end of the supports. The flame disk features supports that are defined by individual leg members each having a lower section which includes the contact end and an upper section which defines one of the hole coverings. The hole coverings are arranged so as to be free from contact with the raised extensions defining the holes. The holes extend radially in alignment with a radial extension of the leg members, and each of the leg members includes an internal section that extends from an interior end of a corresponding one of the hole coverings into contact with the face portion of the plate. In an embodiment of the invention, each leg member includes an outer section extending radially out away from the raised peripheral edge of the plate and has a free end defining the surface contact end of the supports. The outer section slopes downward from between the raised peripheral edge and the surface contact end. Also, an interior surface of the outer section contacts the raised peripheral edge of the plate. With this embodiment of the invention, the holes extend radially between a radial inner end and a radial outer end, and the hole coverings extend both radially inward of the radial inner end of the holes and radially out away from the radial outer end of the holes, and the hole coverings extend parallel to the upper face of the plate.

The invention also features a smoker grill assembly that comprises a base pan having a side wall and bottom with the bottom including a heat passage opening and a flame disk positioned within the base pan and over the heat passage opening. The flame disk includes a plate having heat passage openings and legs which support the plate in a suspended state with respect to the bottom of the pan, and the legs being in a non-connected state with respect to the base pan for easy removal. Under this embodiment of the invention, the heat passage openings in the plate are defined by raised extensions extending off a face surface of the plate and the legs have hole covering sections that extend above the heat passage openings so as to completely cover the heat passage openings from a plan view perspective. Also, in this embodiment the plate includes a raised peripheral edge which extends upward off the face surface of said plate to a lesser extent than that of said raised extensions defining the heat passage openings. There are also a plurality of circumferentially spaced heat passage openings and an equal number of legs with hole covering sections extending over the heat passage openings, and the leg members each include an internal support section extending between an interior end of a corresponding one of said hole coverings into a connective relationship with respect to the face surface of the plate and an external support section extending radially out from a peripheral edge of the plate such that the hole coverings are suspended above the heat passage openings. The base pan has a central circular opening and the plate is circular, and the plate has a diameter that is more than that of the central circular opening in the base pan. The smoker grill assembly further comprising a cooking unit with a heat source positioned centrally of the bottom of the base pan so as to direct heat though the central opening in the base pan and a covering dome member dimensioned for covering an open top end of the base pan.

Other objects and advantages of the present invention will become apparent from the following description, taken in connection with the accompanying drawings. Wherein, by way of illustration and example, an embodiment of the present invention is disclosed.

The drawings constitute a part of this specification and include exemplary embodiments to the invention, which may be embodied in various forms.

BRIEF DESCRIPTION OF THE DRAWINGS

FIG. 4 is an assembly view showing the flame disk in position with respect to the smoker grill assembly.

DETAILED DESCRIPTION OF THE INVENTION

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
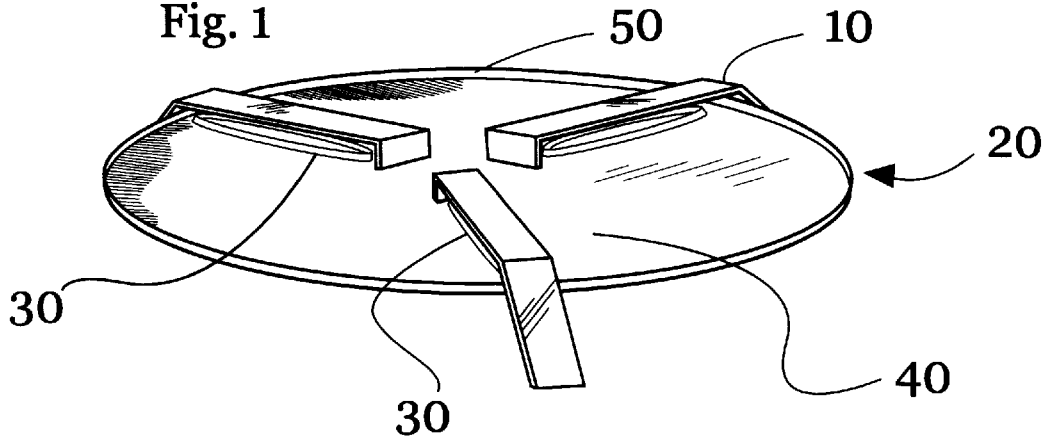
FIG. 1 is a perspective view of the smoker grill flame disk of the present invention.

FIG. 1 provides a perspective view of flame disk 20 with support and cover legs 10 connected with round metal disk 40.

FIG. 1 also illustrates raised hole 30 provided in flame disk 20.

Round metal disk 40 is further shown to include raised edge 50 provided on the periphery of metal disk 40.

Figure 2:
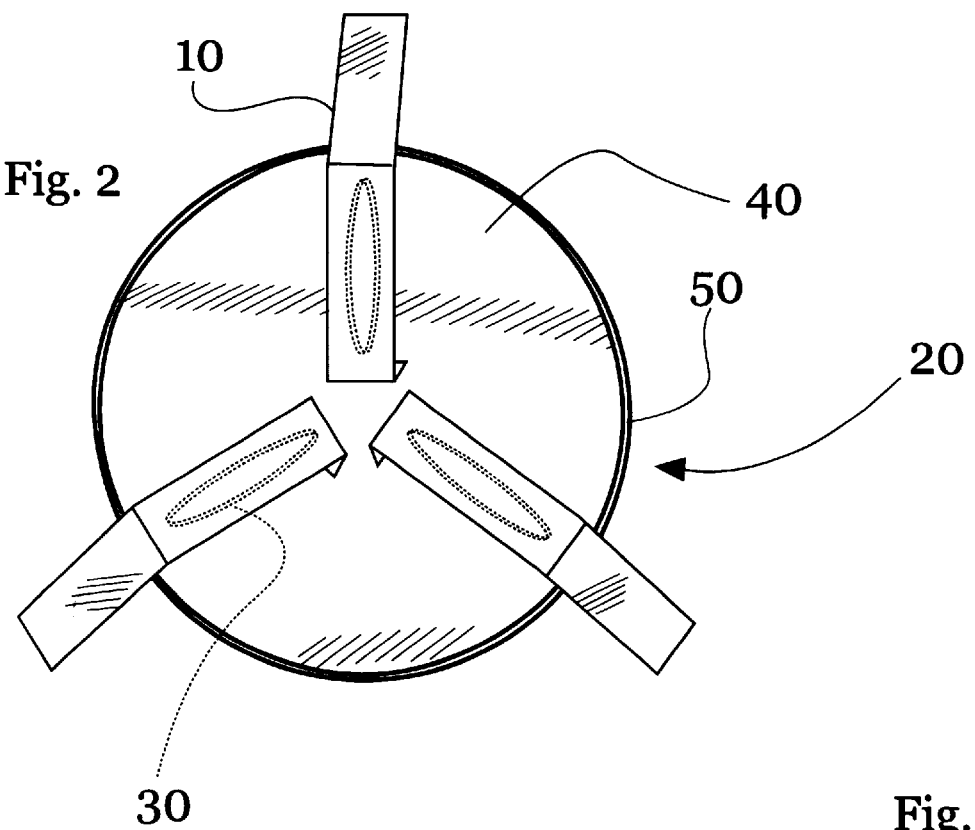
FIG. 2 is a top view of the smoker grill flame disk.

FIG. 2. provides a plan view of flame disk 20 with support and cover legs 10.

Further, FIG. 2 provides in its plan view an illustration of the relative positioning of the covering section of support and cover legs 10 with respect to raised holes 30 provided in metal disk 40 of the smoke grill flame disk 20.

The plan view of FIG. 2 also further illustrates the round metal disk's raised edge 50.

Figure 3:
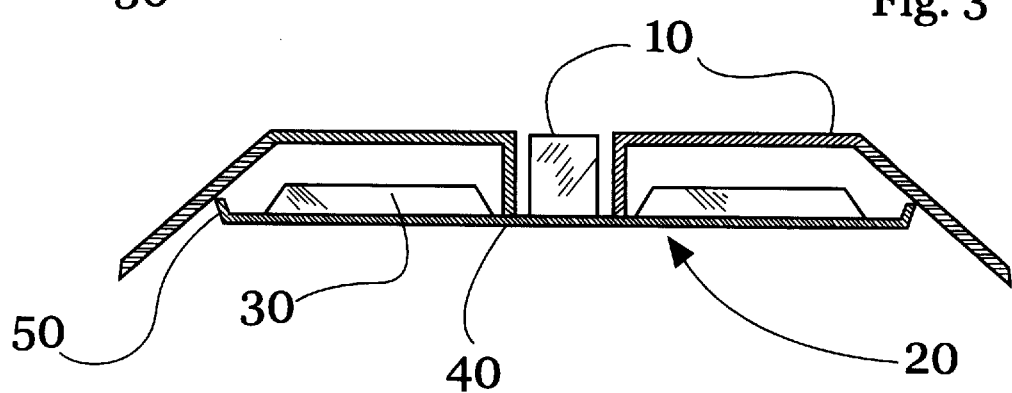
FIG. 3 is a cross-sectional view of the smoker grill flame disk taken along cross-section line III—III in FIG. 2.

FIG. 3 provides a cross-sectional view taken along cross section line III—III in FIG. 2. As shown in FIG. 3, flame disk support and cover legs 10 of flame disk 20 extend completely over, in the radial direction, raised holes 30 of the round metal disk 40. FIG. 3 shows raised edge 50 on disk 40 in abutment with the sloping section of each of legs 10. FIG. 4 illustrates the flame disk in use within a smoker grill assembly including the relative placement of the smoker grill base 100, the relative positioning of the smoker grill flame disk 20 inside the smoker grill assembly, the relative positioning of the smoker body and dome 300, the relative positioning of grill rack 400, the relative positioning of the water bowl 500, and the relative positioning of the gas cooker 600.

The above described invention thus provides an apparatus for helping to provide even heat distribution when using an external flame and for helping to prevent internal food drippings from escaping through the disk. The features of the above described flame disk includes the providing of a disk design that—

A) is heat efficient;

B) safeguards against drippings or ashes falling to burner or ground;

C) helps provide better performance when cooking; and

D) includes holes in the disk that are raised, and has attached legs strategically placed over the raised holes in the disk, which adds additional protection against food drippings and ashes from escaping through the disk holes to the burner ground.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A flame disk, comprising:

a plate having a peripheral edge and a plurality of holes formed internally of the peripheral edge;

leg supports, said leg supports being connected with said plate and said leg supports having a lower contact end positioned below said plate so as to place said plate in a suspended state with respect to said leg supports, and said leg supports having an upper section which extends over said holes so as to cover said holes.

2. A flame disk as recited in claim 1 wherein each of said holes is defined by a raised extension extending upward from a base portion of said plate.

3. A flame disk as recited in claim 2 wherein the peripheral edge of said plate is defined by a raised edge which extends upward from the base portion of said plate.

4. A flame disk as recited in claim 3 wherein said raised extension of said holes extends vertically up from the base portion of said plate to a greater extent than that of said raised edge.

5. A flame disk as recited in claim 2 wherein an upper edge of each of said holes defines an exit opening having an exit opening perimeter, and the upper section of said support legs extends over respective exit openings and each of said upper sections has a covering area which exceeds an area defined by the exit opening perimeter being covered such that said upper sections completely cover, from a plan view perspective, said exit openings.

6. A flame disk as recited in claim 5 wherein said upper sections extend parallel with an upper face of the base portion of said plate.

7. A flame disk as recited in claim 6 wherein said leg supports include an internal extension which extends from an internal end of respective upper sections into contact with the upper face of said base portion.

8. A flame disk as recited in claim 7 wherein said internal section extends transversely with respect to both said upper section and said base portion.

9. A flame disk as recited in claim 7 wherein said leg supports include an outer section extending radially out from an outer end of said upper section, and said outer section including a sloped section that extends to the lower contact end of said leg supports.

10. A flame disk as recited in claim 9 wherein said plate includes a raised outer edge, and said sloped section has a slope which places an interior surface of said sloped section in a flush relationship with respect to said raised outer edge of said plate.

11. A flame disk as recited in claim 9 wherein the upper face of said plate is suspended at about an intermediate height of a rise in said sloped section.

12. A flame disk as recited in claim 1 wherein said plate is a circular plate.

13. A flame disk as recited in claim 1 wherein said plate has a plurality of raised edges defining said holes which raised edges extend radially in a common direction with a radial extension of the upper section of said leg supports.

14. A flame disk as recited in claim 13 wherein said raised edges have an oblong shape with a radial length that is less than a radial extension of said upper section and a maximum circumferential width that is less than that of a corresponding upper section so that said upper extensions completely cover over corresponding oblong shaped holes.

15. A flame disk as recited in claim 14 wherein there are three individual leg supports and three oblong shaped holes formed in said plate.

16. A flame disk for use in smoking or grilling apparatus, comprising:

a plate having a raised peripheral edge and a plurality of holes internally of said raised peripheral edge, and said holes being defined by a raised extension extending up from a face portion of said plate;

hole coverings that extend vertically above an upper edge of respective raised extensions so as to completely cover said holes, when viewed in a plan view perspective;

supports that are in contact with said plate such that said plate is suspended above a surface contact end of said supports.

17. A flame disk as recited in claim 16 wherein said supports are defined by individual leg members each having a lower section which includes said contact end and an upper section which defines one of said hole coverings.

18. A flame disk as recited in claim 17 wherein said hole coverings are free from contact with said raised extensions defining said holes.

19. A flame disk as recited in claim 17 wherein said holes extend radially in alignment with a radial extension of said leg members, and each of said leg members including an internal section that extends from an interior end of a corresponding one of said hole coverings into contact with the face portion of said plate.

20. A flame disk as recited in claim 19 wherein each leg member includes an outer section extending radially out away from the raised peripheral edge of said plate and having a free end defining said surface contact end of said supports.

21. A flame disk as recited in claim 20 wherein said outer section slopes downward from between the raised peripheral edge and said surface contact end.

22. A flame disk as recited in claim 21 wherein an interior surface of said outer section contacts said raised peripheral edge of said plate.

23. A flame disk as recited in claim 17 wherein said holes extend radially between a radial inner end and a radial outer end, and said hole coverings extend both radially inward of the radial inner end of said holes and radially out away from the radial outer end of said holes.

24. A flame disk as recited in claim 16 wherein said hole coverings extend parallel to the upper face of said plate.

25. A smoker grill assembly, comprising:

a base pan having a side wall and bottom, and said bottom including a heat passage opening;

a flame disk positioned within said base pan and over said heat passage opening, said flame disk including a plate having heat passage openings and legs which support said plate in a suspended state with respect to the bottom of said pan, and said legs being in a non-connected state with respect to said base pan for easy removal.

26. A smoker grill assembly as recited in claim 25 wherein the heat passage openings in said plate are defined by raised extensions extending off a face surface of said plate and said legs having hole covering sections that extend above said heat passage openings so as to completely cover said heat passage openings from a plan view perspective.

27. A smoker grill assembly as recited in claim 26 wherein said plate includes a raised peripheral edge which extends upward off the face surface of said plate to a lesser extent than that of said raised extensions defining the heat passage openings.

28. A smoker grill assembly as recited in claim 28 wherein there are a plurality of circumferentially spaced heat passage openings and an equal number of legs with hole covering sections extending over said heat passage openings.

29. A smoker grill assembly as recited in claim 28 wherein said leg members each include an internal support section extending between an interior end of a corresponding one of said hole coverings into a connective relationship with respect to the face surface of said plate and an external support section extending radially out from a peripheral edge of said plate such that said hole coverings are suspended above said heat passage openings.

30. A smoker grill assembly as recited in claim 25 wherein said base pan has a central circular opening and said plate is circular, and said plate having a diameter that is more than that of the central circular opening in said base pan.

31. A smoker grill assembly as recited in claim 30 further comprising a cooking unit with a heat source positioned centrally of the bottom of said base pan so as to direct heat though the central opening in said base pan and a covering dome member dimensioned for covering an open top end of said base pan.

* * * * *